(12) United States Patent
Ohmacht

(10) Patent No.: US 8,533,399 B2
(45) Date of Patent: Sep. 10, 2013

(54) CACHE DIRECTORY LOOK-UP RE-USE AS CONFLICT CHECK MECHANISM FOR SPECULATIVE MEMORY REQUESTS

(75) Inventor: Martin Ohmacht, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 12/984,252

(22) Filed: Jan. 4, 2011

(65) Prior Publication Data

US 2011/0202731 A1    Aug. 18, 2011

Related U.S. Application Data

(60) Provisional application No. 61/295,669, filed on Jan. 15, 2010.

(51) Int. Cl.
 *G06F 12/00* (2006.01)
(52) U.S. Cl.
 USPC ............ 711/137; 711/128; 711/141; 711/144; 711/145; 712/207; 712/215; 712/216; 712/237
(58) Field of Classification Search
 USPC ......... 711/128, 137, 141, 144, 145; 712/207, 712/215, 216, 237
 See application file for complete search history.

(56) References Cited

U.S. PATENT DOCUMENTS

| | | | |
|---|---|---|---|
| 5,895,492 A | 4/1999 | Greenspan et al. | |
| 6,212,605 B1 | 4/2001 | Arimilli et al. | |
| 6,347,360 B1 | 2/2002 | Moudgal et al. | |
| 6,356,983 B1 | 3/2002 | Parks | |
| 6,460,130 B1 * | 10/2002 | Trull et al. | 712/32 |
| 2002/0083297 A1 | 6/2002 | Modelski et al. | |
| 2002/0133672 A1 * | 9/2002 | Van De Waerdt et al. | 711/128 |
| 2003/0014597 A1 * | 1/2003 | van de Waerdt | 711/136 |
| 2004/0193845 A1 | 9/2004 | Thimmannagari et al. | |
| 2005/0204119 A1 | 9/2005 | Saha | |
| 2006/0095680 A1 * | 5/2006 | Park et al. | 711/137 |
| 2006/0161919 A1 | 7/2006 | Onufryk et al. | |
| 2007/0028021 A1 | 2/2007 | Gaskins | |
| 2007/0168619 A1 | 7/2007 | Hutton et al. | |
| 2007/0192540 A1 | 8/2007 | Gara et al. | |
| 2007/0294481 A1 | 12/2007 | Hoover et al. | |
| 2008/0195820 A1 * | 8/2008 | Lais et al. | 711/146 |
| 2008/0307169 A1 * | 12/2008 | Averill et al. | 711/146 |
| 2008/0313437 A1 | 12/2008 | Gschwind | |
| 2009/0031310 A1 | 1/2009 | Lev et al. | |
| 2009/0083488 A1 | 3/2009 | Madriles Gimeno et al. | |
| 2009/0235262 A1 | 9/2009 | Ceze et al. | |

(Continued)

OTHER PUBLICATIONS

Office Action dated Nov. 26, 2012 received in a related U.S. Appl. No. 13/008,546.

(Continued)

*Primary Examiner* — Hong Kim
(74) *Attorney, Agent, or Firm* — Scully, Scott, Murphy & Presser, P.C.; Daniel P. Morris, Esq.

(57) ABSTRACT

In a cache memory, energy and other efficiencies can be realized by saving a result of a cache directory lookup for sequential accesses to a same memory address. Where the cache is a point of coherence for speculative execution in a multiprocessor system, with directory lookups serving as the point of conflict detection, such saving becomes particularly advantageous.

15 Claims, 5 Drawing Sheets

(56) References Cited

U.S. PATENT DOCUMENTS

| | | | |
|---|---|---|---|
| 2009/0276581 A1* | 11/2009 | Moga et al. | 711/146 |
| 2010/0169577 A1 | 7/2010 | Kiyota | |
| 2010/0205609 A1* | 8/2010 | Cypher | 718/105 |
| 2010/0332765 A1* | 12/2010 | Cypher | 711/141 |
| 2011/0066811 A1* | 3/2011 | Sander et al. | 711/137 |

OTHER PUBLICATIONS

Office Action dated Apr. 3, 2013 received in a related U.S. Appl. No. 13/008,546.

Office Action dated Apr. 15, 2013 received in a related U.S. Appl. No. 13/008,583.

* cited by examiner

CACHE DIRECTORY LOOK-UP RE-USE AS CONFLICT CHECK MECHANISM FOR SPECULATIVE MEMORY REQUESTS

CROSS-REFERENCE TO RELATED APPLICATIONS

Benefit is claimed of the following prior applications, all of which are incorporated by reference herein.

Benefit of the following applications is claimed and they are also incorporated by reference: U.S. patent application Ser. No. 12/796,411 filed Jun. 8, 2010; U.S. Pat. No. 8,103,910 issued Jan. 24, 2012; U.S. provisional patent application Ser. No. 61/293,611, filed Jan. 8, 2010; U.S. provisional patent application Ser. No. 61/295,669, filed Jan. 15, 2010; U.S. provisional patent application Ser. No. 61/299,911 filed Jan. 29, 2010; U.S. Pat. No. 8,275,954 issued Sep. 25, 2012; U.S. Pat. No. 8,275,964 issued Sep. 25, 2012; U.S. patent application Ser. No. 12/684,190, filed Jan. 8, 2010; U.S. patent application Ser. No. 12/684,496, filed Jan. 8, 2010; U.S. Pat. No. 8,347,001 issued Jan. 1, 2013; U.S. patent application Ser. No. 12/697,799 filed Feb. 1, 2010; U.S. patent application Ser. No. 12/684,738, filed Jan. 8, 2010; U.S. patent application Ser. No. 12/684,860, filed Jan. 8, 2010; U.S. Pat. No. 8,268,389 issued Sep. 18, 2012; U.S. Pat. No. 8,359,404 issued Jan. 22, 2013; U.S. patent application Ser. No. 12/684,852, filed Jan. 8, 2010; U.S. Pat. No. 8,429,377 issued Apr. 23, 2013; U.S. Pat. No. 8,356,122 issued Jan. 15, 2013; U.S. provisional patent application Ser. No. 61/293,237, filed Jan. 8, 2010; U.S. patent application Ser. No. 12/693,972, filed Jan. 26, 2010; U.S. Pat. No. 8,086,766 issued Dec. 27, 2011; U.S. patent application Ser. No. 12/688,773, filed Jan. 15, 2010; U.S. patent application Ser. No. 12/684,776, filed Jan. 8, 2010; U.S. Pat. No. 8,255,633 issued Aug. 28, 2012; U.S. Pat. No. 8,347,039 issued Jan. 1, 2013; U.S. provisional patent application Ser. No. 61/293,494, filed Jan. 8, 2010; U.S. Pat. No. 8,359,367 issued Jan. 22, 2013; U.S. Pat. No. 8,327,077 issued Dec. 4, 2012; U.S. Pat. No. 8,364,844 issued Jan. 29, 2013; U.S. patent application Ser. No. 12/727,967, filed Mar. 19, 2010; U.S. patent application Ser. No. 12/727,984, filed Mar. 19, 2010; U.S. patent application Ser. No. 12/697,043 filed Jan. 29, 2010; U.S. patent application Ser. No. 12/697,175, Jan. 29, 2010; U.S. Pat. No. 8,370,551 issued Feb. 5, 2013; U.S. Pat. No. 8,312,193 issued Nov. 13, 2012; U.S. patent application Ser. No. 12/723,277 filed Mar. 12, 2010; U.S. Pat. No. 8,412,974 issued Apr. 2, 2013; U.S. patent application Ser. No. 12/696,817 filed Jan. 29, 2010; U.S. patent application Ser. No. 12/697,164, filed Jan. 29, 2010; U.S. patent application Ser. No. 12/796,411, filed Jun. 8, 2010; and, U.S. patent application Ser. No. 12/796,389, filed Jun. 8, 2010.

GOVERNMENT CONTRACT

This invention was made with Government support under Contract No.: B554331 awarded by Department of Energy. The Government has certain rights in this invention 21—Speculation and transaction in a system

BACKGROUND

The field of the invention is the use of cache memory, and in particular directory lookups in cache memories.

Cache memories have long served to make computers more efficient, by providing a relatively small and relatively fast local storage in a processing device. The cache allows currently active data to be accessed conveniently by an associated processor without accesses to the relatively larger and slower main memory—or worse still, the even larger and slower disk. In multi-processor systems with speculative execution, caching has become quite elaborate. The prior generation of IBM® Blue Gene® supercomputer system had three levels of caches, denoted L1, L2, and L3.

One common technique for organizing a cache is to make it set associative. This means that the cache is organized into pieces. Each piece is called a set. Each set includes a number of ways, each including a cache line. A memory access request accesses a set stored in a cache directory, and selects a way and thus a line of the cache.

For more information on caches, the reader is directed to the article entitled "CPU Cache" in Wikipedia.

Due to the requirements of such systems, and due to the decreasing cost of memory, caches have become much larger and more numerous. In a supercomputer, there may be thousands of cache memories each having more than 10 MB of data. These supercomputers can draw electrical power on the order of megawatts. Each component must be scrutinized for possible energy efficiency improvement

SUMMARY

The inventor here has discovered, that, surprisingly, given the extraordinary size of this type of supercomputer system, the caches, originally sources of efficiency and power reduction, have become significant power consumers—so that they themselves must be scrutinized to see how they can be improved.

The architecture of the current version of IBM® Blue Gene® supercomputer includes coordinating speculative execution at the level of the L2 cache, with results of speculative execution being stored by hashing a physical main memory address to a specific cache set—and using a software thread identification number along with upper address bits to direct memory accesses to corresponding ways of the set. The directory lookup for the cache becomes the conflict checking mechanism for speculative execution.

In a cache that has 16 ways, each memory access request for a given cache line, requires searching all 16 ways of the selected set along with elaborate conflict checking. When multiplied by the thousands of caches in the system, these lookups become energy inefficient—especially in the case where several sequential, or nearly sequential, lookups access the same line.

Thus the new generation of supercomputer gave rise to an environment where directory lookup becomes a significant component of the energy efficiency of the system. Accordingly, it would be desirable to save results of lookups in case they are needed by subsequent memory access requests.

In one embodiment, in a cache memory of a data processing system, a method includes:

receiving a plurality of memory access requests;

queuing the requests;

checking a given one of requests against at least one entry in a cache directory to yield a memory access request related result;

storing at least one such result; and responsive to a subsequent one of the requests, using the stored result rather than checking the cache directory to find the result.

In another embodiment, within a cache memory control unit, apparatus includes:
  at least one input adapted to receive at least one memory access request;
  at least one directory unit adapted to retrieve data from cache lines responsive to the memory access request; and
  at least one storage unit adapted to retain an indication responsive to the memory access request, so that the indication can be used in a subsequent memory access request.

In another embodiment, a system includes
  at least one processor;
  a cache memory shared by the processors, comprising:
  a directory unit, for retrieving data responsive to memory access requests from the processors
  lines for storing data; and
  a sub-cache adapted to store at least one address or data result related to a prior memory access request.

Objects and advantages will be apparent in the following.

BRIEF DESCRIPTION OF DRAWING

Embodiments will now be described by way of non-limiting example with reference to the following figures.

DETAILED DESCRIPTION

The following document relates to write piggybacking in the context of DRAM controllers:

Shao, J. and Davis, B. T. 2007, "A Burst Scheduling Access Reordering Mechanism," In Proceedings of the 2007 IEEE 13th international Symposium on High Performance Computer Architecture (Feb. 10-14, 2007). HPCA. IEEE Computer Society, Washington, D.C., 285-294. DOI= http://dx.doi.org/10.1109/HPCA.2007.346206

This article is incorporated by reference herein.

It would be desirable to reduce directory SRAM accesses to reduce power and increase throughput in accordance with one or both of the following methods:
  1. On hit, store cache address and selected way in a register
    a. Match subsequent incoming requests and addresses of line evictions against the register
    b. If encountering a matching request and no eviction has been encountered yet, use way from register without directory SRAM look-up
  2. Reorder requests pending in the request queue such that same set accesses will execute in subsequent cycles
  3. Reuse directory SRAM look-up information for subsequent access using bypass These methods are especially effective if the memory access request generating unit can provide a hint whether this location might be accessed soon or if the access request type implies that other cores will access this location soon, e.g., atomic operation requests for barriers Throughout this disclosure a particular embodiment of a multi-processor system will be discussed. This discussion may include various numerical values. These numerical values are not intended to be limiting, but only examples. One of ordinary skill in the art might devise other examples as a matter of design choice.

Figure 1:
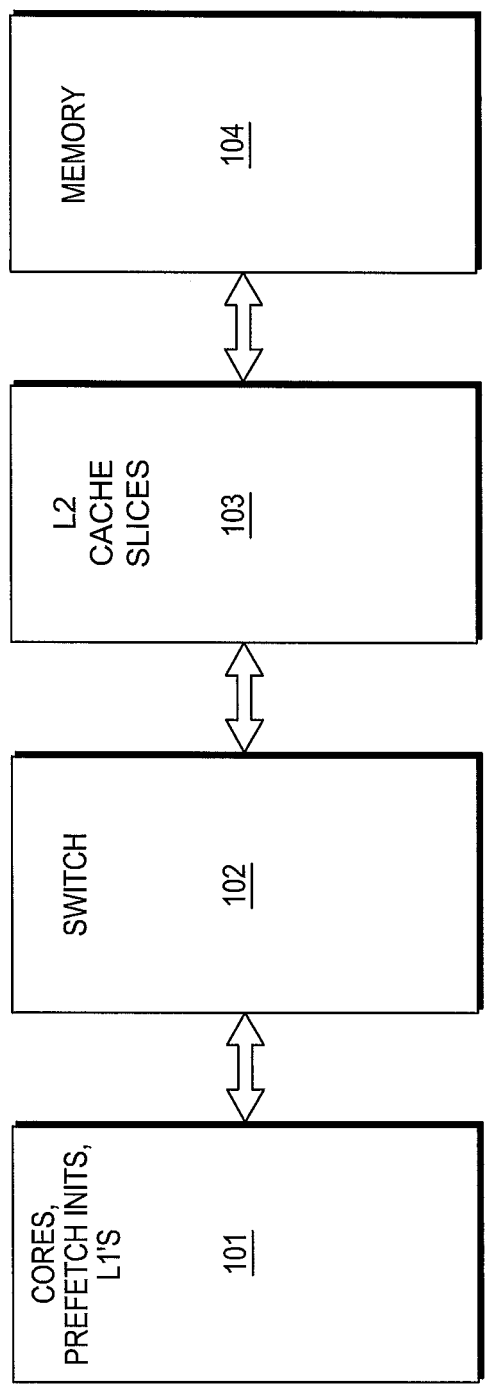
FIG. 1 shows an overview of a system within which the invention may be implemented.

The present invention arose in the context of the IBM® Blue Gene® project, which is further described in the applications incorporated by reference above. FIG. 1 is a schematic diagram of an overall architecture of a multiprocessor system in accordance with this project, and in which the invention may be implemented. At 101, there are a plurality of processors operating in parallel along with associated prefetch units and L1 caches. At 102, there is a switch. At 103, there are a plurality of L2 slices. At 104, there is a main memory unit. It is envisioned, for the preferred embodiment, that the L2 cache should be the point of coherence.

Figure 2:
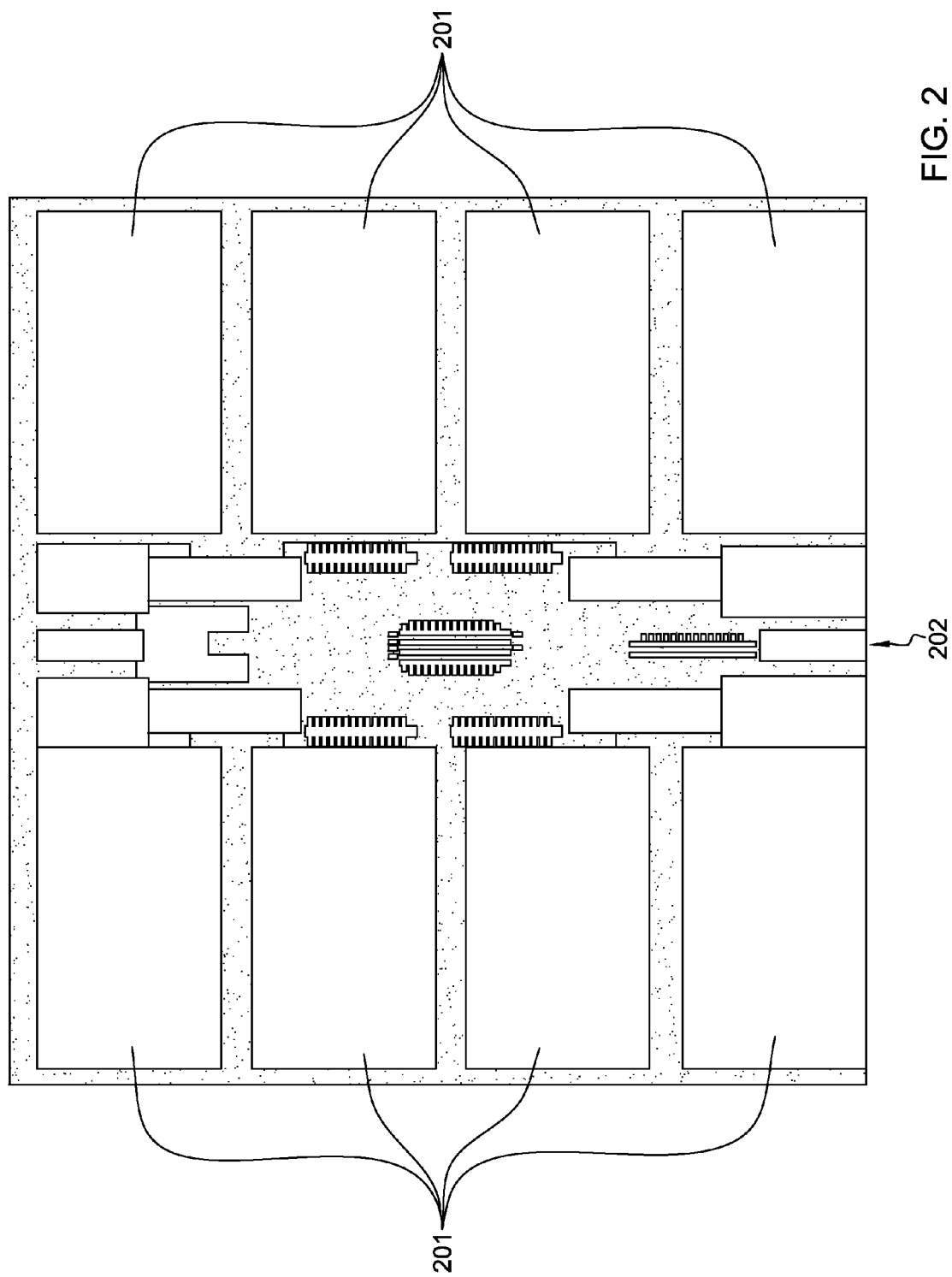
FIG. 2 shows a map of a cache slice.

FIG. 2 shows a cache slice. It includes arrays of data storage 201, and a central control portion 202.

Figure 3:
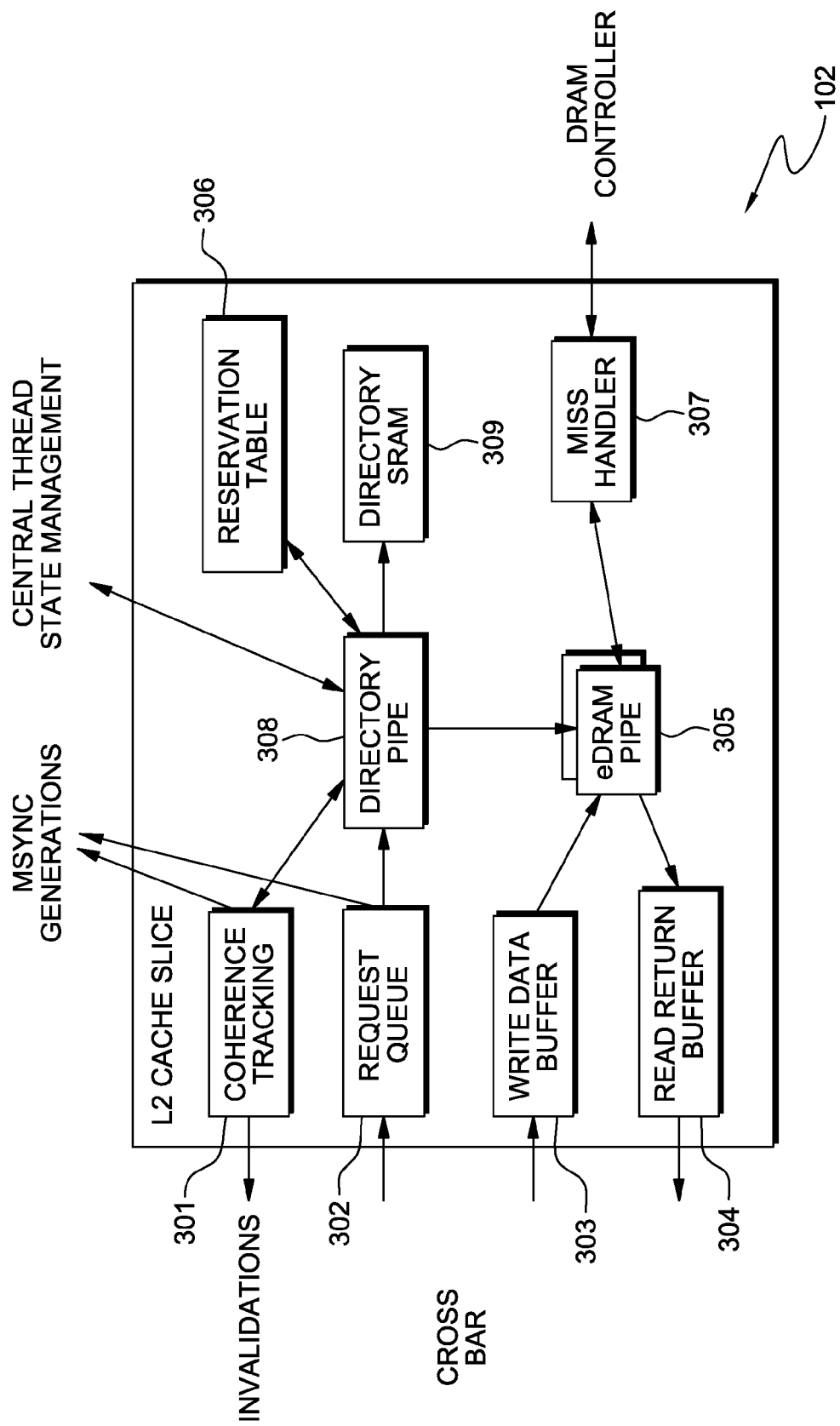
FIG. 3 is a schematic of the control unit of an L2 slice.

FIG. 3 shows features of an embodiment of the control section 102 of a cache slice 72.

Coherence tracking unit 301 issues invalidations, when necessary. These invalidations are issued centrally, while in the prior generation of the Blue Gene® project, invalidations were achieved by snooping.

The request queue 302 buffers incoming read and write requests. In this embodiment, it is 16 entries deep, though other request buffers might have more or less entries. The addresses of incoming requests are matched against all pending requests to determine ordering restrictions. The queue presents the requests to the directory pipeline 308 based on ordering requirements.

The write data buffer 303 stores data associated with write requests. This buffer passes the data to the eDRAM pipeline 305 in case of a write hit or after a write miss resolution.

The directory pipeline 308 accepts requests from the request queue 302, retrieves the corresponding directory set from the directory SRAM 309, matches and updates the tag information, writes the data back to the SRAM and signals the outcome of the request (hit, miss, conflict detected, etc.).

The L2 implements four parallel eDRAM pipelines 305 that operate independently. They may be referred to as eDRAM bank 0 to eDRAM bank 3. The eDRAM pipeline controls the eDRAM access and the dataflow from and to this macro. If writing only subcomponents of a doubleword or for load-and-increment or store-add operations, it is responsible to schedule the necessary RMW cycles and provide the dataflow for insertion and increment.

The read return buffer 304 buffers read data from eDRAM or the memory controller 78 and is responsible for scheduling the data return using the switch 60. In this embodiment it has a 32B wide data interface to the switch. It is used only as a staging buffer to compensate for backpressure from the switch. It is not serving as a cache.

The miss handler 307 takes over processing of misses determined by the directory. It provides the interface to the DRAM controller and implements a data buffer for write and read return data from the memory controller.

The reservation table 306 registers and invalidates reservation requests.

In the current embodiment of the multi-processor, the bus between the L1 to the L2 is narrower than the cache line width by a factor of 8. Therefore each write of an entire L2 line, for instance, will require 8 separate transmissions to the L2 and therefore 8 separate lookups. Since there are 16 ways, that means a total of 128 way data retrievals and matches. Each lookup potentially involves all this conflict checking that was just discussed, which can be very energy-consuming and resource intensive.

Therefore it can be anticipated that—at least in this case—an access will need to be retained. A prefetch unit can annotate its request indicating that it is going to access the same line again to inform the L2 slice of this anticipated requirement.

Certain instruction types, such as atomic operations for barriers, might result in an ability to anticipate sequential memory access requests using the same data.

One way of retaining a lookup would be to have a special purpose register in the L2 slice that would retain an identification of the way in which the requested address was found. Alternatively, more registers might be used if it were desired to retain more accesses.

Another embodiment for retaining a lookup would be to actually retain data associated with a previous lookup to be used again.

Figure 3A:
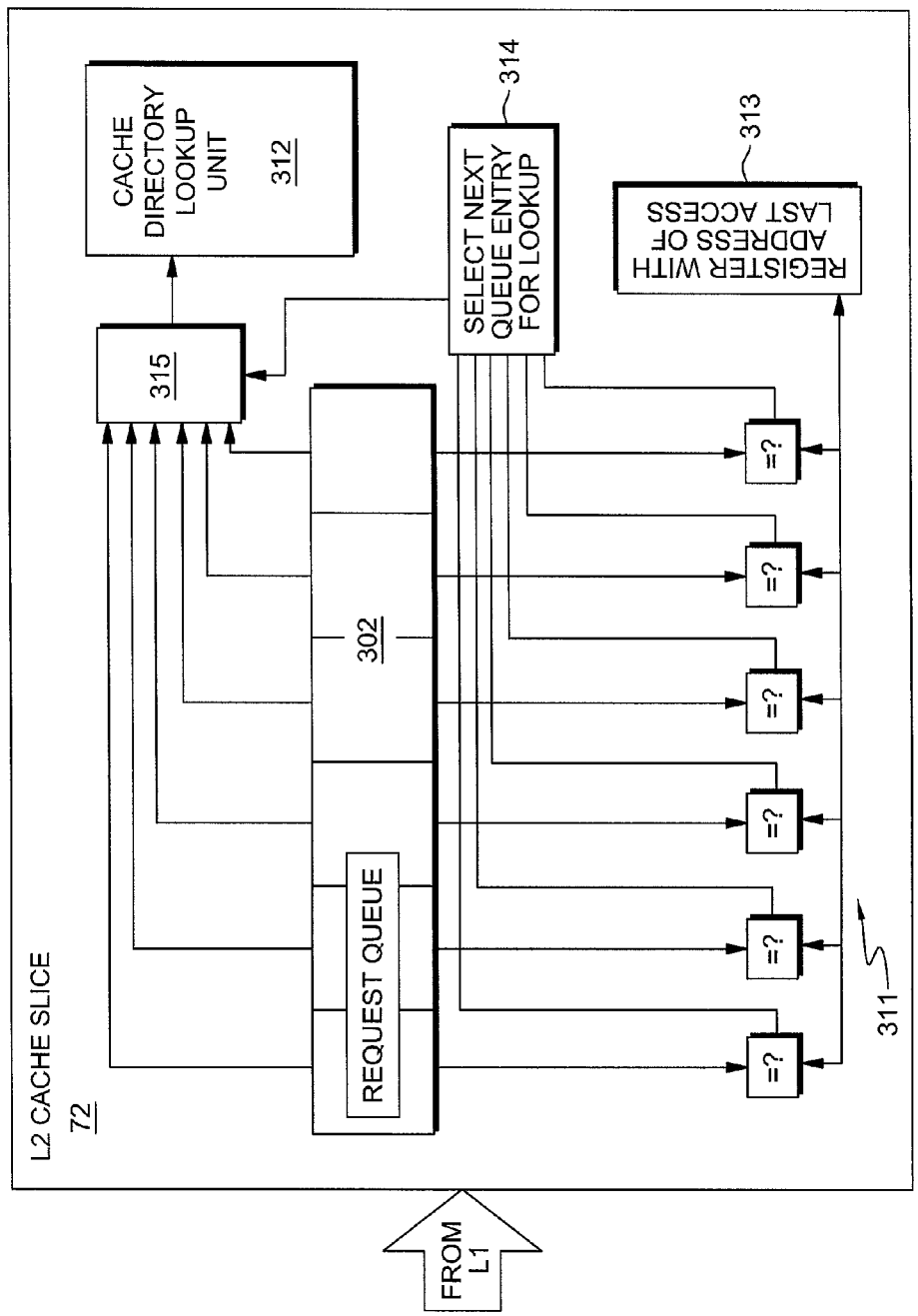
FIG. 3A shows a request queue and retaining data associated with a previous memory access request.
Figure 3B:
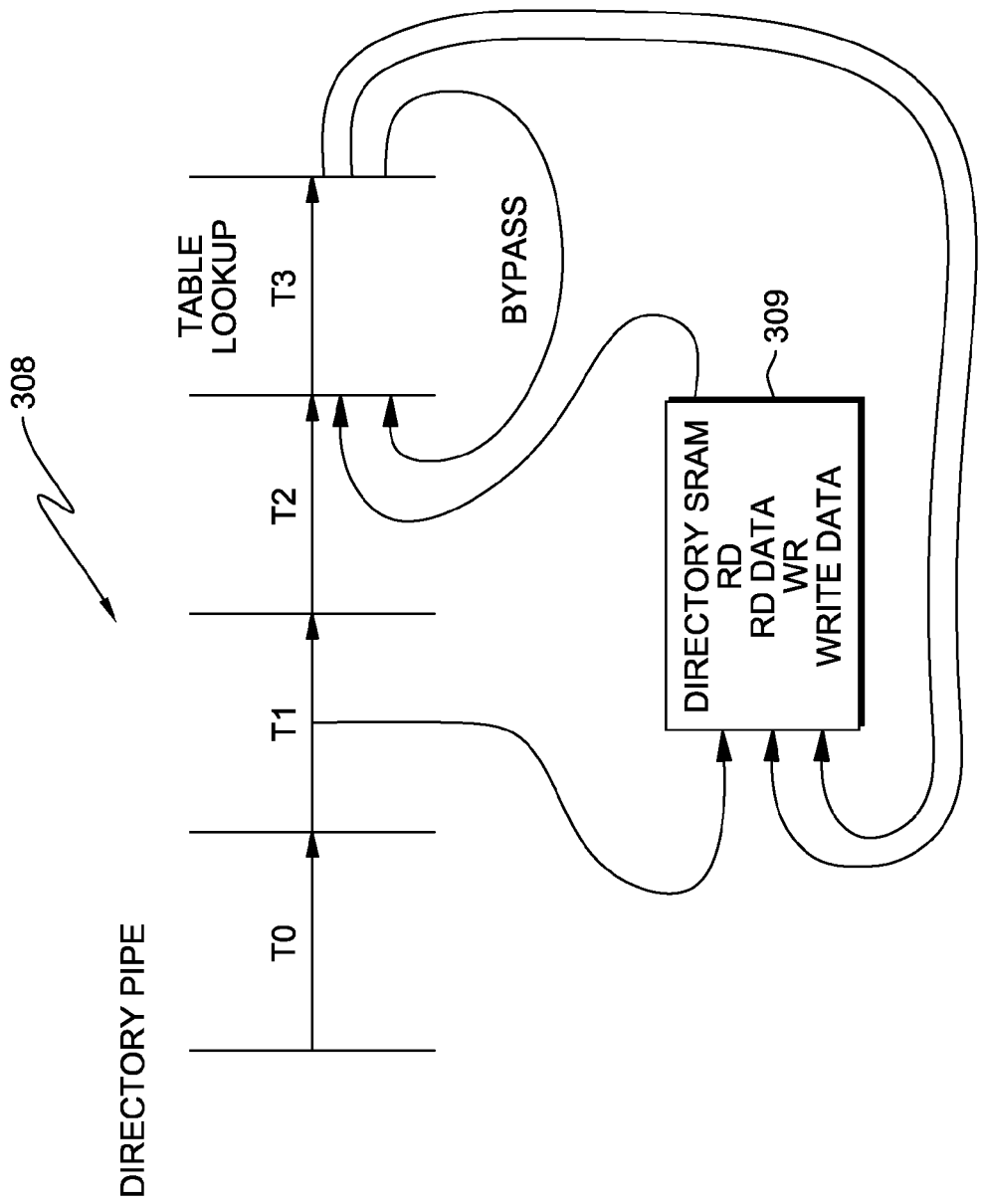
FIG. 3B shows interaction between the directory pipe and directory SRAM.

An example of the former embodiment of retaining lookup information is shown in FIG. 3A. The L2 slice 72 includes a request queue 302. At 311, a cascade of modules tests whether pending memory access requests will require data associated with the address of a previous request, the address being stored at 313. These tests might look for memory mapped flags from the L1 or for some other identification. A result of the cascade 311 is used to create a control input at 314 for selection of the next queue entry for lookup at 315, which becomes an input for the directory look up module 312. These mechanisms can be used for reordering, analogously to the Shao article above, i.e., selecting a matching request first. Such reordering, together with the storing of previous lookup results, can achieve additional efficiencies FIG. 3B shows more about the interaction between the directory pipe 308 and the directory SRAM 309. The vertical lines in the pipe represent time intervals during which data passes through a cascade of registers in the directory pipe. In a first time interval T1, a read is signaled to the directory SRAM. In a second time interval T2, data is read from the directory SRAM. In a third time interval, T3, the directory matching phase may alter directory data and provide it via the Write and Write Data ports to the directory SRAM. In general, table lookup will govern the behavior of the directory SRAM to control cache accesses responsive to speculative execution. Only one table lookup is shown at T3, but more might be implemented. More detail about the lookup is to be found in the applications incorporated by reference herein, but, since coherence is primarily implemented in this lookup, it is an elaborate process. In particular, in the current embodiment, speculative results from different concurrent processes may be stored in different ways of the same set of the cache. Records of memory access requests and line evictions during concurrent speculative execution will be retained this directory. Moreover, information from cache lines, such as whether a line is shared by several cores, may be retained in the directory. Conflict checking will include checking these records and identifying an appropriate way to be used by a memory access request. Retaining lookup information can reduce use of this conflict checking mechanism.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The word "comprising", "comprise", or "comprises" as used herein should not be viewed as excluding additional elements. The singular article "a" or "an" as used herein should not be viewed as excluding a plurality of elements. Unless the word "or" is expressly limited to mean only a single item exclusive from other items in reference to a list of at least two items, then the use of "or" in such a list is to be interpreted as including (a) any single item in the list, (b) all of the items in the list, or (c) any combination of the items in the list. Ordinal terms in the claims, such as "first" and "second" are used for distinguishing elements and do not necessarily imply order of operation.

Items illustrated as boxes in flowcharts herein might be implemented as software or hardware as a matter of design choice by the skilled artisan. Software might include sequential or parallel code, including objects and/or modules. Modules might be organized so that functions from more than one conceptual box are spread across more than one module or so that more than one conceptual box is incorporated in a single module. Data and computer program code illustrated as residing on a medium might in fact be distributed over several media, or vice versa, as a matter of design choice. Such media might be of any suitable type, such as magnetic, electronic, solid state, or optical Any algorithms given herein can be implemented as computer program code and stored on a machine readable medium, to be performed on at least one processor. Alternatively, they may be implemented as hardware. They are not intended to be executed manually or mentally.

The use of variable names in describing operations in a computer does not preclude the use of other variable names for achieving the same function.

The present application may use language that is anthropomorphic in describing operations of a computer. Any such anthropomorphic language is not intended to imply that the claimed invention reads on a human being thinking or performing manual operations. The claims are intended to be interpreted as reading on operations of a machine.

The invention claimed is:

1. In a cache memory of a data processing system, a method comprising:
    receiving a plurality of memory access requests;
    queuing the requests;
    checking a given one of requests against at least one entry in a cache directory to yield a memory access request related result;
    storing at least one such result; and
    responsive to a subsequent one of the requests, using the stored result rather than checking the cache directory to find the result, wherein the cache memory serves as a point of coherence for a multiprocessor system, said cache directory including records of memory access requests from speculative threads in the multiprocessor system, said requests checking comprising:

using the directory to detect conflicts between speculative threads; and using the stored result allows skipping checking for conflicts between speculative threads.

2. The method of claim 1, comprising: responsive to the given request, detecting the subsequent request as relating to a same location in the cache as the given request and wherein using the stored result is also responsive to such detecting.

3. The method of claim 1, comprising,
responsive to the queuing, detecting memory accesses using a same cache resource; and
reordering the requests within the queue so that the given and subsequent request are immediately adjacent one another.

4. The method of claim 1, wherein the result is an indication of a particular cache resource.

5. The method of claim 4, wherein the particular cache resource is a way of the cache.

6. The method of claim 1, wherein the result is data retrieved from a cache resource.

7. The method of claim 1, wherein storing comprises retaining a plurality of such results at the same time.

8. The method of claim 1, wherein
the cache memory comprises a plurality of sets and a plurality of ways;
the given request specifies a given set, but not which way;
the checking identifies a way; and
the result relates to the identification of the way.

9. The method of claim 1, wherein checking comprises verifying that a line has not been evicted.

10. Within a cache memory control unit, apparatus comprising:
at least one input adapted to receive at least one memory access request;
at least one directory unit adapted to retrieve data from cache lines responsive to the memory access request; and
at least one storage unit adapted to retain an indication responsive to the memory access request, so that the indication can be used in a subsequent memory access request, wherein
said directory unit comprises conflict checking mechanisms relating to speculative execution in a processor coupled with the cache control unit, and said indication allowing the subsequent memory access to use data from the cache without repeating conflict checking.

11. The apparatus of claim 10, wherein the indication comprises data related to contents of a cache line.

12. The apparatus of claim 10, wherein the cache memory comprises a plurality of ways and the indication identifies at least one of the ways that was associated with the request.

13. The apparatus of claim 10, wherein when the memory access request is associated with a line eviction from the cache, an invalidation of a previously established indication is issued.

14. A system comprising
at least one processor;
a cache memory shared by the at least one processor, comprising:
a directory unit, for retrieving data responsive to memory access requests from the processors lines for storing data; and
a register adapted to store at least one address or data result related to a prior memory access request, wherein
a plurality of processors are adapted to perform speculative execution in parallel;
said cache configured to manage conflict detection for the processors;
the register operating to avoid conflict detection for sequential requests to access a same memory resource.

15. The system of claim 14, wherein the cache is adapted to reorder requests so that requests for the same memory resource are sequential.

* * * * *